May 17, 1955 W. P. BOOTHROYD 2,708,716
COMMUNICATION SYSTEM
Filed March 30, 1951
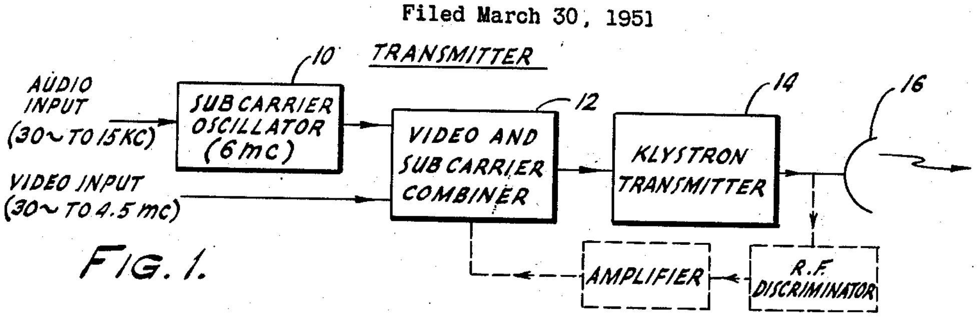
FIG. 1.
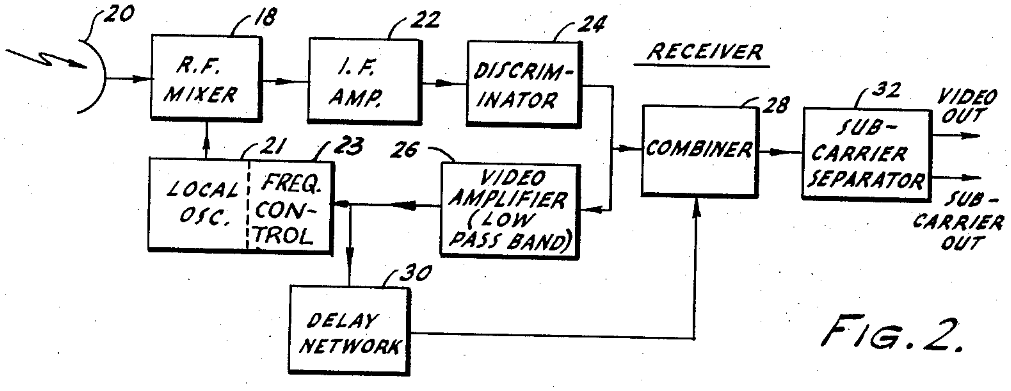
FIG. 2.
FIG. 3.
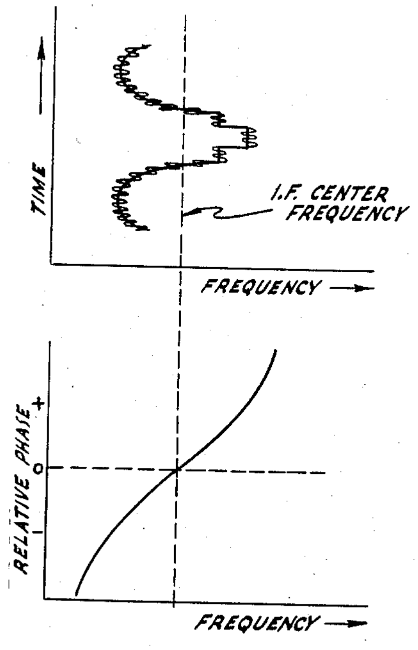
FIG. 4.
FIG. 5.
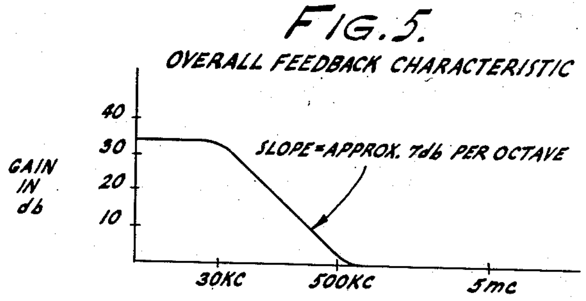
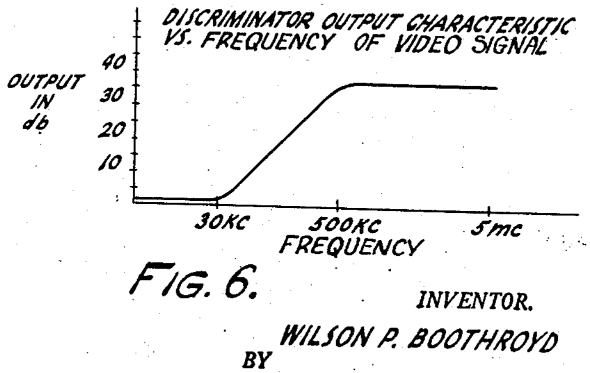
FIG. 6.
INVENTOR.
WILSON P. BOOTHROYD
BY
Brown, Denk & Synnestvedt
AGENTS

United States Patent Office 2,708,716

Patented May 17, 1955

2,708,716

COMMUNICATION SYSTEM

Wilson P. Boothroyd, Huntingdon Valley, Pa., assignor to Philco Corporation, Philadelphia, Pa., a corporation of Pennsylvania Application March 30, 1951, Serial No. 218,486

10 Claims. (Cl. 250—6)

The present invention relates to multiplex terminal equipment for multi-channel communication service. It is particularly suited for use in connection with frequency-modulated microwave radio relay repeaters designed to accommodate television programs and other intelligence signals having a wide modulation bandwidth.

In an article entitled "A microwave communication relay system" by Wilson P. Boothroyd and Harold J. Churchill, appearing in the AIEE Transactions, vol. 68 of 1949 (a publication of the American Institute of Electrical Engineers) there is described a radio repeater employing negative feedback in connection with a locked radio-frequency oscillator. An incoming frequency-modulated R.-F. carrier is used to cause a deviation of the oscillator frequency in accordance with the carrier modulation. The oscillator energy is radiated as the repeater output signal. The application of negative feedback to the repeater is operative in two principal ways to minimize distortion—first, such feedback decreases nonlinearities in the control-voltage versus output-frequency characteristic of the oscillator, and, second, the resulting deviation of the repeater I.-F. frequency, which is the difference between the incoming carrier and the R.-F. oscillator frequency deviations, is sufficiently small so that phase and amplitude distortions in amplifier circuits are minimized. In effect, therefore, the negative feedback path serves to substantially eliminate changing I.-F. frequencies by causing the local oscillator to track the incoming signal modulation. This effect, as explained in the reference, is a function of frequency, being very large for low or modulating frequencies.

In one embodiment of a radio repeater of the type described in the AIEE paper mentioned above, the incoming frequency-modulated carrier is mixed with the output of a local oscillator (which may, for example, be a klystron) to form an I.-F. signal. This I.-F. signal is amplified and applied to a discriminator. The latter is directly coupled to a suitable control element of the local oscillator so that the oscillator is effectively locked to the incoming signal but differs therefrom by the I.-F. frequency. By means of this negative feedback connection difficulties arising from microphonics and circuit nonlinearities are largely overcome.

When a communication system of conventional superheterodyne type is designed to handle wide-band modulating signals, however, it has been found that its performance is not completely acceptable. Such is the case, for example, when the system is utilized for the simultaneous transmission of both the video component of a television signal and an additional high-frequency carrier signal. If the video signal has added thereto a super-video sub-carrier, and this combined signal is applied as a modulating signal to a typical frequency modulated radio frequency transmission system, it is found that both amplitude and phase modulation of this sub-carrier occur resulting in "crosstalk" of the video signal onto the sub-carrier. Consequently, it is necessary in many cases to transmit the audio portion of the composite television signal through a separate channel, or else over some entirely distinct medium such as a telephone line. No practical method has heretofore been known by which both the sound and video signal components may be combined for such transmission without incurring excessive crosstalk due to interaction between the separate signal portions, especially if the audio sub-carrier is assigned a frequency of the order of, say, 6 megacycles.

The present disclosure, therefore, features means for utilizing negative feedback in a microwave communication system suitable for the transmission and reception of wide-band modulation such as a television signal, whereby modulation of an audio sub-carrier by the video signal is substantially eliminated and crosstalk reduced to a minimum. Although the system is suitable for use as a feedback repeater, the concept will nevertheless be described as embodied in terminal equipment, since its principles of operation are best understood in that connection.

One object of the present invention, therefore, is to provide an improved form of communication system capable of handling wide-band information such, for example, as a composite television signal together with a supervideo carrier signal.

Another object of the present invention is to provide a microwave terminal equipment employing negative feedback, and designed to pass a wide modulation bandwidth without incurring crosstalk over the passband.

Other objects and advantages will be apparent from the following description of a preferred form of the invention and from the drawing, in which:

Figure 1 is a block diagram of transmitting apparatus designed in accordance with the present invention;

Figure 2 is a block diagram of terminal equipment designed to receive the signal transmitted by the apparatus of Figure 1;

Figure 3 shows the frequency versus time characteristic of an I.-F. amplifier such as might be used in the circuit of Figure 2;

Figure 4 shows the frequency versus phase characteristic of the same I.-F. amplifier; and Figures 5 and 6 are characteristic operating curves of certain circuit portions of Figure 2.

To the foregoing ends it is a feaure of the present invention to provide, in a communication system wherein a frequency-modulated carrier wave signal is modulated by a composite signal comprising an amplitude-varying component having frequency components extending throughout a predetermined low frequency range and a frequency-modulated sub-carrier component which varies within a predetermined higher frequency range, the system further including a local oscillator, a converter supplied with said frequency-modulated carrier wave signal and with a signal from said local oscillator for producing an intermediate frequency signal, an amplifier for said intermediate frequency signal, said amplifier having a nonlinear phase characteristic tending to cause spurious phase modulation of said sub-carrier component by said amplitude-varying component, and a frequency discriminator for detecting said amplified intermediate-frequency signal, the improvement which comprises means for selecting a portion of the detected output from said frequency discriminator comprising frequency components in a range whose maximum frequency does not substantially exceed the highest frequency component in the modulation of said sub-carrier, and means for controlling the frequency of said local oscillator in accordance with the amplitude of said portion to reduce the spurious phase modulation of said sub-carrier component.

Referring first to the transmitter of Figure 1, there is shown a sub-carrier oscillator 10 having an operating frequency of, say, 6 megacycles. This oscillator 10 is frequency modulated by an audio signal having generally a range of about 30 cycles to 15 kilocycles. The output of the oscillator 10 is applied to a mixer or combiner 12 which also receives an amplitude-varying video signal input ranging from, say, 30 cycles to 4.5 megacycles. The output of the video and sub-carrier combiner 12 is applied to frequency modulate a transmitter 14 which may, for example, be a reflex klystron. To prevent intermodulation of the above two signals the combiner 12 and the modulation characteristic of transmitter 14 must be linear. With reasonable care crosstalk between the sub-carrier and video components of the signal from these sources can be confined to low values. If necessary, feedback can be applied to units 12 and 14 by detecting the radio frequency signal with a radio frequency discriminator, amplifying this discriminator output, and applying the signal thus obtained to the combiner 12 in accordance with the teachings of the above-noted reference and as shown in Figure 1 by the dotted components.

The receiver terminal equipment of Figure 2 includes an R.-F. mixer 18 to which is applied both the signal picked up by antenna 20 as well as the output of a local oscillator 21. Connected to the mixer 18 is an I.-F. amplifier 22, the latter being followed by a discriminator 24. The discriminator may, if desired, include one or more limiters to correct any random amplitude-modulation of the I.-F. signal. A video amplifier 26, to be more fully described below, and a frequency control circuit 23 coupled to amplifier 26, comprise the elements of a feedback path between the discriminator 24 and the local oscillator 21.

The local oscillator 21 is of conventional form and preferably comprises a reflex klystron tube (not shown) having a reflector electrode. The frequency of oscillator 21 may then be varied in accordance with the amplitude of the output signal of video amplifier 26 by applying this signal, at an appropriate D.-C. voltage level, to the reflector electrode of the klystron. In this case, the frequency control circuit 23 is an intrinsic element of local oscillator 21, comprising the reflector electrode of the reflex klystron.

Alternatively, local oscillator 21 may comprise a lumped-parameter, frequency-determining resonant circuit (not shown) to which is coupled the frequency control circuit 23, in the form of a conventional reactance-tube circuit (not shown). The frequency of local oscillator 21, in the present case, may be varied in accordance with the amplitude of the output signal of amplifier 26 by applying the latter signal to a control element (not shown) of the reactance tube. Frequency control circuits of the above-mentioned types are well known in the art and are fully described in the publication, "Microwave Receivers," edited by S. N. Van Voorhis, McGraw-Hill Book Company, Inc., 1948, at pages 28 through 35 thereof.

The reason why video-to-sub-carrier crosstalk normally occurs in a conventional superheterodyne receiver amplifying a frequency-modulated carrier is illustrated in Figures 3 and 4. Figure 3 shows a typical frequency versus time plot of the intermediate frequency of a typical amplifier when the input modulation is the sum of an amplitude-varying video signal plus a frequency-modulated sub-carrier. Figure 4 shows the relative phase characteristic of a typical I.-F. amplifier indicating that the amplifier time delay is a function of frequency as is known. Therefore as the I.-F. signal frequency changes due to the video modulation, the sub-carrier is subjected to a varying amplifier time delay owing to the nonlinearity of the amplifier phase characteristic. This is equivalent to undesired frequency modulation of the sub-carrier and when the sub-carrier is demodulated to recover the original audio modulation the resulting signal will be contaminated by crosstalk in the audio spectrum. While the higher video frequency signal components produce crosstalk, only the audible signals (i. e. below 15 kc.) are of importance since conventional filters can remove crosstalk signals outside of the desired audio frequency band.

When phase modulation of the audio sub-carrier results from one particular component of the video signal (such as 1,000 cycles, for example) the undesired interference obtained when the sub-carrier is demodulated will be of this same 1,000-cycle frequency. Since the present invention is concerned only with crosstalk which produces audio interference (the sub-carrier conveying only audio information up to a maximum of approximately 15 kilocycles), the video amplifier 26 is designed with a sufficiently low passband so that feedback is provided to the local oscillator 21 substantially only at audio frequencies.

In accordance with this invention, it should be noted that if the sub-carrier could be amplified at a constant center I.-F. carrier frequency, or if it is not deviated therefrom at an audio frequency rate, crosstalk of the video signal into the sound channel due to phase modulation of the audio sub-carrier may be prevented. To accomplish this, the local oscillator 21 is caused (by feedback through amplifier 26) to track the incoming frequency-modulated signal substantially only for audio-frequency modulation—that is, up to approximately 30 kilocycles. It has been found in practice that tracking of the local oscillator 21 may be made as high as 99% for these audio modulation frequencies, with the tracking thereafter falling off at a suitable rate such as 7 *db* per octave until approximately 480 kilocycles is reached in accordance with the teaching of the foregoing reference. At frequencies above this latter figure (5 octaves) there is essentially no feedback through the video amplifier 26. The operating characteristic of this unit may accordingly be somewhat as illustrated in Figure 5.

If an amplitude-varying video signal is derived from the discriminator 24 of the receiver of Figure 2, as described, it will have substantially the amplitude versus frequency characteristic set forth in Figure 6. In other words, no low-frequency information up to approximately 30 kilocycles is present because of the feedback connection through the video amplifier 26. However, this low-frequency, or audio, information is available at the local oscillator control point in accordance with the amplitude response of Figure 5. Hence, voltages from these two sources may be combined in a unit 28 to produce the original intelligence signals.

It may be desirable to insert a time delay network 30 between the video amplifier 26 and the combiner 28. This delay network 30 has a time interval equal to the delay introduced into the signal path by the I.-F. amplifier 22. This compensation may be necessary because the audio signal in the output of the amplifier 26 is in-phase with the incoming carrier modulation, whereas the video signal in the output of the discriminator 24 is affected by the time-delay of the I.-F. amplifier. However, in practice, it may be found that the delay network 30 can be eliminated. A conventional sub-carrier separating circuit 32 (such as a filter assembly) is then employed to segregate the sub-carrier and video signals. Following this the sub-carrier may be demodulated to derive audio modulation free of crosstalk from the video signal.

Having thus described my invention, I claim:

1. In a communication system, means for generating a carrier wave which is frequency-modulated by a composite signal, said composite signal comprising an amplitude-varying portion having frequency components extending throughout a predetermined frequency range and a subcarrier portion which is frequency-modulated within a predetermined different frequency range by an intelligence wave, said intelligence wave consisting of frequency components falling within a specified frequency range included within said predetermined frequency range, a local oscillator, a frequency converter, supplied with said carrier wave and with a signal from said local oscillator, for producing an intermediate frequency signal at its output, an amplifier supplied with said intermediate frequency signal, said amplifier having a non-linear phase characteristic tending to cause spurious phase modulation of said subcarrier portion by said amplitude-varying portion, a frequency discriminator for detecting said amplified intermediate frequency signal, means for selecting that portion of the detected output of said frequency discriminator which consists of frequency components included within said specified frequency range, and means for controlling the frequency of said local oscillator in accordance with the amplitude of said last-named portion, thereby to reduce the spurious phase modulation of said subcarrier portion.

2. A communication system according to claim 1 wherein said means for selecting said portion of said detected output comprises a second amplifier coupled to the output of said discriminator and arranged to transmit signals having frequencies falling within said specified frequency range and to reject substantially completely signals having frequencies outside of said specified frequency range, and wherein the output of said second amplifier is coupled to the input of said means for controlling the frequency of said local oscillator.

3. A communication system according to claim 1 including, in addition, means for combining the output from said discriminator with the output from said means for selecting said portion of said detected output, thereby to produce a resultant composite output signal.

4. A communication system according to claim 3 including, in addition, means for delaying the output of said selecting means before combining it with the output of said discriminator.

5. A communication system according to claim 4 in which said delay means is operative to delay the output of said selecting means by an amount which is substantially equal to the delay to which said intermediate frequency signal is subjected in said intermediate frequency amplifier.

6. In a communication system, means for generating a carrier wave which is frequency-modulated by a composite signal, said composite signal comprising an amplitude-varying portion having frequency components extending throughout a predetermined low frequency range and a sub-carrier portion which is frequency-modulated within a predetermined higher frequency range by an intelligence wave, said intelligence wave consisting of frequency components falling within a third predetermined frequency range included within said predetermined low frequency range, a local oscillator, a frequency converter supplied with said carrier wave and with a signal from said local oscillator, for producing an intermediate frequency signal, an amplifier supplied with said intermediate frequency signal, said amplifier having a non-linear phase characteristic tending to cause spurious phase modulation of said subcarrier portion by said amplitude-varying portion, a frequency discriminator for detecting said amplified intermediate-frequency signal, means including said discriminator, coupled to the output of said intermediate frequency amplifier and arranged to derive from said intermediate frequency signal an output wave consisting of signal components of said amplitude-varying portion having frequencies within said third predetermined frequency range, and means for varying the frequency of said local oscillator in accordance with the amplitude of said output wave, thereby to reduce the spurious phase modulation of said subcarrier portion.

7. In a communication system, means for generating a carrier wave which is frequency-modulated by a composite signal, said composite signal comprising an amplitude-varying portion having frequency components extending throughout a predetermined low frequency range and a subcarrier portion which is frequency-modulated within a predetermined higher frequency range by an intelligence wave, said intelligence wave consisting of frequency components falling within a third predetermined frequency range included within said predetermined low frequency range, a local oscillator, a frequency converter supplied with said carrier wave and with a signal from said local oscillator, for producing an intermediate frequency signal at its output, an amplifier supplied with said intermediate frequency signal, said amplifier having a non-linear phase characteristic tending to cause spurious phase modulation of said subcarrier portion by said amplitude-varying portion, a frequency discriminator for detecting said amplified intermediate frequency signal, means for selecting that portion of the detected output of said frequency discriminator which consists of frequency components included within said third predetermined frequency range, and means for controlling the frequency of said local oscillator in accordance with the amplitude of said last-named portion, thereby to reduce the spurious phase modulation of said subcarrier portion.

8. In a communication system, a frequency converter, means for generating a carrier wave which is frequency-modulated by a composite signal, said composite signal comprising an amplitude-varying portion having frequency components extending throughout a predetermined low frequency range and a subcarrier portion which is frequency-modulated within a predetermined higher frequency range by an intelligence wave, said intelligence wave consisting of frequency components falling within a third predetermined frequency range included within said predetermined low frequency range, means for coupling the output of said carrier wave-generating means to one input of said converter, a local oscillator, means for coupling the output of said local oscillator to another input of said converter, means for deriving an intermediate frequency signal from the output of said converter, an amplifier supplied with said intermediate frequency signal, said amplifier having a non-linear phase characteristic tending to cause spurious phase modulation of said subcarrier portion by said amplitude-varying portion, a frequency discriminator for detecting said amplified intermediate frequency signal, means for selecting that portion of the detected output of said frequency discriminator which consists of frequency components included within said third predetermined frequency range, and means for controlling the frequency of said local oscillator in accordance with the amplitude of said last-named portion, thereby to reduce the spurious phase modulation of said subcarrier portion.

9. In a communication system, means for generating a carrier wave which is frequency-modulated by a composite signal, said composite signal comprising an amplitude-varying video signal having frequency components extending throughout a predetermined low frequency range and a subcarrier signal which is frequency-modulated within a predetermined higher frequency range by an audio intelligence wave, said audio intelligence wave consisting of frequency components falling within a third predetermined frequency range included within said predetermined low frequency range and including the audio frequency range, a local oscillator, a frequency converter, supplied with said carrier wave and with a signal from said local oscillator, for producing an intermediate frequency signal, an amplifier supplied with said intermediate frequency signal, said amplifier having a non-linear phase characteristic tending to cause spurious phase modulation of said subcarrier signal by said amplitude-varying video signal, a frequency discriminator for detecting said amplified intermediate frequency signal, means for selecting that portion of the detected output of said frequency discriminator which consists of those frequency components of said amplitude-varying video signal which are included within said third predetermined frequency range, and means for controlling the frequency of said local oscillator in accordance with the amplitude of said portion, thereby to reduce the spurious phase modulation of said subcarrier signal.

10. In a communication system, means for generating a carrier wave which is frequency-modulated by a composite signal, said composite signal comprising an amplitude-varying portion having frequency components extending throughout a predetermined low frequency range and a subcarrier portion which is frequency-modulated within a predetermined higher frequency range by an intelligence wave, said intelligence wave consisting of frequency components falling within a third predetermined frequency range included within said predetermined low frequency range and extending to a given frequency within the audio frequency range, a local oscillator, a frequency converter, supplied with said carrier wave and with a signal from said local oscillator, for producing an intermediate frequency signal, an amplifier supplied with said intermediate frequency signal, said amplifier having a non-linear phase characteristic tending to cause spurious phase modulation of said subcarrier portion by said amplitude-varying portion, a frequency discriminator for detecting said amplified intermediate frequency signal, means for selecting that portion of the detected output of said frequency discriminator which consists of frequency components included within said third predetermined frequency range, and means for controlling the frequency of said local oscillator in accordance with the amplitude of said last-named portion, thereby to reduce the spurious phase modulation of said subcarrier portion.

References Cited in the file of this patent

UNITED STATES PATENTS

| | | |
|---|---|---|
| 2,162,885 | Foster | June 20, 1939 |
| 2,233,183 | Roder | Feb. 25, 1941 |
| 2,433,350 | Earp | Dec. 30, 1947 |
| 2,504,663 | Dome | Apr. 18, 1950 |
| 2,544,311 | Gottier | Mar. 6, 1951 |
| 2,553,368 | Green | May 15, 1951 |
| 2,564,059 | Gensel | Aug. 14, 1951 |
| 2,570,758 | Braden | Oct. 8, 1951 |